(12) United States Patent
Fleureau et al.

(10) Patent No.: US 10,133,547 B2
(45) Date of Patent: Nov. 20, 2018

(54) METHOD AND DEVICE FOR SYNTHESIZING A SOUND

(71) Applicant: THOMSON LICENSING, Issy les Moulineaux (FR)

(72) Inventors: Julien Fleureau, Rennes (FR); Yoan Lefevre, Talence (FR); Philippe Guillotel, Vern sur Seiche (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 14 days.

(21) Appl. No.: 15/268,024

(22) Filed: Sep. 16, 2016

(65) Prior Publication Data

US 2017/0075655 A1    Mar. 16, 2017

(30) Foreign Application Priority Data

Sep. 16, 2015  (EP) .................................. 15306420

(51) Int. Cl.
| | |
|---|---|
| *H03G 3/00* | (2006.01) |
| *G06F 3/041* | (2006.01) |
| *G06F 3/16* | (2006.01) |
| *G06K 15/02* | (2006.01) |
| *G06F 3/0354* | (2013.01) |

(52) U.S. Cl.
CPC .......... *G06F 3/167* (2013.01); *G06F 3/03547* (2013.01); *G06F 3/041* (2013.01); *G06F 3/165* (2013.01); *G06K 15/02* (2013.01)

(58) Field of Classification Search
CPC ...... G06F 3/016; G06F 3/03545; G06F 3/167; G06F 3/041; G06F 3/0414; G06F 3/0416; G06F 2203/04105; G06F 3/0488; G06F 3/16; H04M 2250/22; H04N 21/42203; H04N 21/42204; H04N 21/42224; H04N 21/4394

USPC ................ 345/173, 179, 174, 156, 1.1, 158; 340/407.2; 178/18.03, 19.02, 19.04; 715/716, 762, 763, 856, 86; 381/150

See application file for complete search history.

(56) References Cited

U.S. PATENT DOCUMENTS

| | | | |
|---|---|---|---|
| 4,911,005 A | 3/1990 | Heyn et al. | |
| 5,694,340 A | 12/1997 | Kim | |
| | (Continued) | | |

FOREIGN PATENT DOCUMENTS

| | | |
|---|---|---|
| JP | 2001051759 | 2/2001 |
| JP | 200716429 | 6/2007 |
| JP | 05002818 | 8/2012 |

OTHER PUBLICATIONS

Ren et al., "Synthesizing Contact Sounds Between Textured Models", IEEE Virtual Reality Conference, Waltham, Massachusetts, USA, Mar. 20, 2010, pp. 139-146.

(Continued)

*Primary Examiner* — Norman Yu
(74) *Attorney, Agent, or Firm* — Brian J. Dorini; Patricia A. Verlangieri (57) ABSTRACT

A method and device for obtaining a sound, wherein an information representative of a speed of a first object moving on a first surface is obtained. The obtained speed information is used with one or more reference sounds to obtain the sound. The one or more reference sounds are associated with a determined speed of displacement of a second object moving on a second surface, the first surface being different from the second surface.

22 Claims, 5 Drawing Sheets

(56) References Cited

U.S. PATENT DOCUMENTS

| | | | |
|---|---|---|---|
| 5,911,170 A * | 6/1999 | Ding | G10H 1/125 84/661 |
| 7,637,172 B2 | 12/2009 | Yu et al. | |
| 2007/0196801 A1 | 8/2007 | Nagasaka et al. | |
| 2009/0242282 A1 | 10/2009 | Kim et al. | |
| 2011/0320204 A1 | 12/2011 | Locker et al. | |
| 2012/0242599 A1 * | 9/2012 | Seo | G06F 1/1641 345/173 |
| 2014/0253478 A1 * | 9/2014 | Jeong | G06F 3/016 345/173 |
| 2014/0306937 A1 | 10/2014 | Lim | |

OTHER PUBLICATIONS

Hanwook et al., "Modeling and Real-Time Generation of Pen Stroke Sounds for Tactile Devices", AES 49th International Conference, London, United Kingdom, Feb. 6, 2013, pp. 1-6.

Anonymous, "Autoregressive moving-average model", http://en.wikipedia.org/wiki/Autoregressive%E2%80%93moving-average_model, Aug. 2016, pp. 1-6.

Dubnov, "Yasas—Yet Another Sound Analysis-Synthesis Method", International Computer Music Conference, New Orleans, Louisiana, USA, Nov. 6, 2006, pp. 1-8.

Lecuyer, "Simulating Haptic Feedback Using Vision: a Survey of Research and Applications of Pseudo-Haptic Feedback", Presence, vol. 18, No. 1, Feb. 2009, pp. 39-53.

Sergeant et al., "Geometrical optimization of an ultrasonic tactile plate for surface texture rendering", Sensors and Actuators : A Physical, vol. 191, No. 1-2, Jun. 2010, pp. 91-100.

Argelaguet et al., "Elastic Images: Perceiving Local Elasticity of Images Through a Novel Pseudo-Haptic Deformation Effect", ACM Transactions on Applied Perception, vol. 10, No. 3, Article 17, Aug. 2013, pp. 1-14.

Schlindwein et al., "Chapter 8 : Autoregressive Spectral Analysis as an Alternative to Fast Fourier Transform Analysis of Doppler Ultrasound Signals", Diagnostic Vascular Ultrasound, Edward Arnold Publishers Ltd., London, Jan. 1992, pp. 74-84.

Pai et al., "Scanning Physical Interaction Behavior of 3D Objects", ACM SIGGRAPH 2001, Los Angeles, California, USA, Aug. 12, 2001, pp. 87-96.

Romano et al., "Creating Realistic Virtual Textures from Contact Acceleration Data", IEEE Transactions on Haptics, vol. 5, No. 2, Apr.-Jun. 2012, pp. 109-119.

Van Den Doel et al., "Foleyautomatic: Physically-based Sound Effects for Interactive Simulation and Animation", ACM SIGGRAPH 2001, Los Angeles, California, USA, Aug. 12, 2001, pp. 1-8.

* cited by examiner

METHOD AND DEVICE FOR SYNTHESIZING A SOUND

1. REFERENCE TO RELATED EUROPEAN APPLICATION

This application claims priority from European Application No. 15306420.9, entitled "Method and Device For Synthesizing A Sound," filed on Sep. 16, 2015, the contents of which are hereby incorporated by reference in its entirety.

2. TECHNICAL FIELD

The present disclosure relates to the domain of haptics. The present disclosure is also understood in the context of the generation of a sound that would occur when touching/rubbing a material.

3. BACKGROUND

With consumer adoption of tablets and smartphones, it is now possible to take advantage of the sense of touch when interacting with content items such as video and pictures. For example, it is now possible to allow someone to "feel" the texture or the roughness of a material rendered in an image. This "feel" may occur when he/she is touching the image by means of haptic effects such as vibrations generated by actuators embedded in end-user devices or by roughness variations using dedicated "smart surfaces" as published in "*Geometrical optimization of an ultrasonic tactile plate for surface texture rendering*" by Peter Sergeant, Frédéric Giraud and Betty Lemaire-Semail in 2010.

When a user interacts via a device such as a mouse, pseudo-haptic techniques can indirectly allow the user to feel texture or relief of material(s) rendered in the image. This introduces a discrepancy between the motion of a handled device and a position of the cursor on the displayed image as described in "*Simulating haptic feedback using vision: A survey of research and applications of pseudo-haptic feedback*" by Anatole Lécuyer in 2009.

To enhance sensory quality, when a user touches a screen or controls a mouse, sound(s) may be generated while touching the screen or controlling the mouse. The sound(s) may correspond to the sound that would be generated when touching or rubbing the material itself. To reach that aim, the sound generated when touching the material may be recorded and replayed when a representation of the material is touched on the tablet/smartphone screen. Such method introduces some limitations. For example, the sound played may have a limited duration. Looping this short-duration sound during a long interaction may introduce artifacts (stitching problem).

4. SUMMARY

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present disclosure relates to a method of obtaining a sound, the method comprising obtaining an information representative of a speed of a first object moving on a first surface. The method further comprises obtaining the sound according to information representative of at least one reference sounds and according to the information representative of the speed, the at least one reference sound being associated with a determined speed of displacement of a second object moving on a second surface, the first surface being different from the second surface.

The present disclosure also relates to an apparatus for obtaining a sound, the apparatus comprising at least one processor configured to obtain an information representative of a speed of a first object moving on a first surface. The at least one processor is further configured to obtain the sound according to information representative of at least one reference sound and according to the information representative of the speed, the at least one reference sound being associated with a determined speed of displacement of a second object moving on a second surface, the first surface being different from the second surface.

According to a particular characteristic, frequency information and energy information of the at least one reference sound are used to obtain the sound.

Advantageously, the sound is obtained by interpolating in frequency and in energy at least two reference sounds.

According to a specific characteristic, frequency information associated with the sound is obtained based on frequency information associated with at least one modelled sample of the at least one reference sound generated by an auto-regressive model.

Advantageously, the at least one reference sound is modelled with the auto-regressive model.

According to a specific characteristic, frequency information associated with a sample of the sound is obtained by linear combination of the modelled sample according to a value of the information representative of the speed corresponding to the sample, and energy information associated with the sample of the sound is obtained by linear combination of energy value associated with the at least one reference sound.

The present disclosure also relates to a signal carrying at least a packet comprising data representative of the obtained sound.

The present disclosure also relates to a computer program product comprising program code instructions to execute the steps of the method of obtaining a sound, when this program is executed on a computer.

The present disclosure also relates to a (non-transitory) processor readable medium having stored therein instructions for causing a processor to perform at least the above-mentioned method of obtaining a sound.

5. LIST OF FIGURES

The present principles will be better understood, and other specific features and advantages will emerge upon reading the following description, the description making reference to the annexed drawings wherein.

6. DETAILED DESCRIPTION OF EMBODIMENTS

The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details.

The present principles will be described in reference to a particular example of a method of obtaining, e.g. generating or synthesizing, a sound when moving a first object (for example a finger or a stylus or a mouse) on a first surface (for example a touch screen or a mouse pad). To that aim, the method uses information representative of the speed of the first object moving on the first surface and information representative of at least two reference sounds, for example frequency and energy information of the at least two information sounds. The at least two reference sounds correspond, for example, to the sound generated when moving a second object (e.g. a finger or a stylus) at a speed (a different speed for each reference sound) on a second surface different from the first surface. The second surface corresponds for example to the surface of a material, an image of which may be rendered while moving the first object on the first surface.

User experience may be enhanced by generating a sound with the rendering of one or more images of a material as if the material was touched or rubbed. A more realistic sound may be generated when taking into account the speed of displacement of the first object moving on the first surface and the reference sounds enables to generate a more realistic sound.

Figure 1:
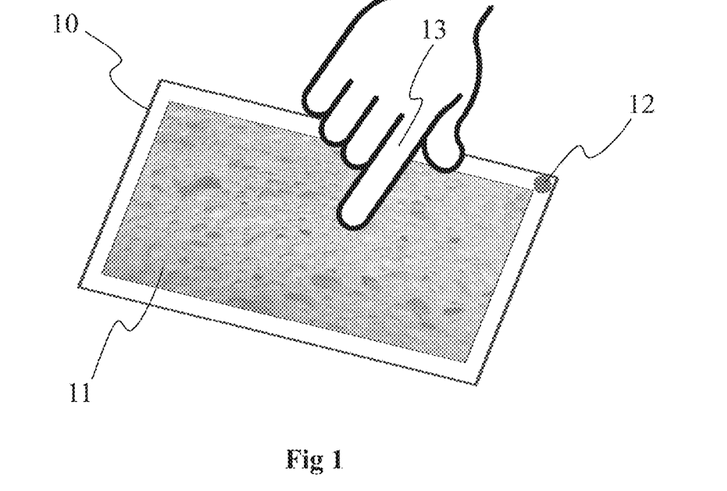
FIG. 1 shows an example of an image representative of a texture associated with a material, according to a specific embodiment of the present principles.
Figure 2:
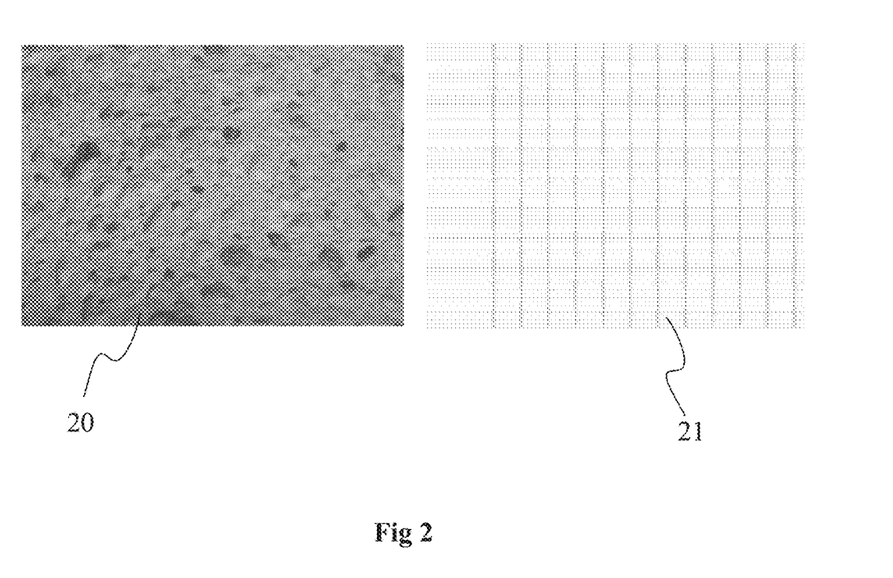
FIG. 2 shows examples of materials, the texture of which being rendered in the image of FIG. 1, according to a particular embodiment of the present principles.

FIG. 1 shows a first object 13, for example a finger, moving on a first surface 10, for example a touch surface of a device such as a tablet or a smartphone, according to a particular and non-limitative embodiment of the present principles. An image 11 of a texture of a material may be displayed on the first surface, for example when the first surface embodies a screen. As used herein, a "texture" is an image that is representative of the aspect of the real surface of a material, called second surface. FIG. 2 illustrates examples of such a second surface. When touching or rubbing the second surface with a second object, a sound is generated that is specific to the material of the second surface. The second object may be the same as the first object but the second object may also be different from the first object (e.g., the first object is a finger and the second object is a stylus). The device may advantageously comprise one or more speakers 12 to render a sound when the first object 13 moves on the first surface 10, the rendered sound being a synthesized sound corresponding to the sound that would be generated when rubbing the second surface of the material, the texture of which may be displayed on the first surface, as illustrated on FIG. 1.

The first object is not limited to a finger but extends to any object, for example a mouse or a stylus. The first surface is not limited to a touch surface either but extends to any surface, for example a mouse pad, a table, a screen. According to another example, the first object corresponds to a mouse moving on a table or on a mouse pad and an image of the surface of the material is displayed on a screen of a laptop or of a computer controlling the mouse. According to this another example, the sound is generated while moving the mouse, the pointer of the mouse moving on the image of the surface of the material displayed on the screen.

The sound rendered by the one or more speakers simulates the sound that would be generated by the rubbing on the second surface, i.e. the real surface of the material that is displayed.

FIG. 2 shows examples of a second surface of a material, according to a particular and non-limitative embodiment of the present principles. According to a first example, the second surface 20 corresponds to the surface of a sponge. According to a second example, the second surface 21 corresponds to the surface of a sheet of paper. The material of the second surfaces 20 and 21 has a shape in 3D, for instance flat or with bumps and/or holes, that may be represented by a 3D model. The sound generated when rubbing or touching the second surface is specific to the type of material but also to the speed of displacement of the second object moving on the second surface.

The material is not limited to a sponge or a sheet of paper but extends to any material such as wood, plastic, cotton, stone, sand, grass for example.

Figure 3:
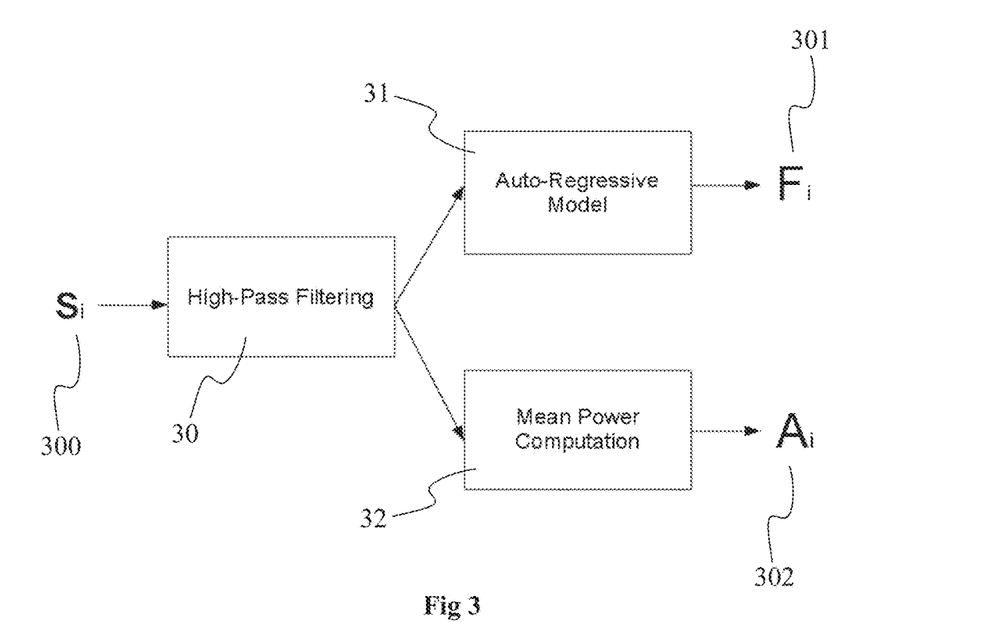
FIG. 3 shows a block diagram of a process to obtain reference sounds when touching or rubbing the material(s) of FIG. 2, according to a particular embodiment of the present principles.

FIG. 3 shows a block diagram of a process for obtaining reference sounds when touching or rubbing one or more second surfaces, according to a particular and non-limitative embodiment of the present principles.

In a first step, an audio signal $S_i$ 300 is acquired by any means, for example with a microphone. The signal $S_i$ 300 is representative of the sound generated by a second object moving on a second surface at a determined speed. According to a variant, the signal $S_i$ 300 is representative of the sound generated by a second object moving on a second surface at a speed increasing with the time. The duration of the acquisition is for example a few milliseconds, a second or even more. According to another variant, a plurality of audio signal $S_i$ 300 are acquired, each signal being acquired with a different speed of motion of the second object on the second surface, for example at low speed, medium speed and high speed. The number of speeds used to obtain the signals is not limited to 3 but extends to any number, for example 2, 5, 10, 20 or more.

Several audio signals $S_i$ 300 may be acquired for different second surfaces, i.e. for different materials, with one or more different motion speeds for each second surface.

The first step is optional as, according to a variant, the signal $S_i$ 300 is not acquired but obtained from a database comprising one or more signals representative of the sound generating by the motion of a second object on a second surface at different speeds. The database may also comprise signals representative of the sounds generated by the motion of a second object on different second surfaces, i.e. on different materials. The database is for example stored in storage unit(s), memories, such as local server(s) or remote server(s) for example.

In an optional second step, the signal $S_i$ 300 is high-pass filtered by a high-pass filtering unit 30. The high-pass filtering of signal $S_i$ 300 may remove the baseline of the signal $S_i$ 300, which does not embed useful audio properties, only the high frequency spectrum of the audio signal is interesting to obtain. The output of the high-pass filtering unit 30 is a centred audio signal. The frequency spectrum and energy (or equivalently the intensity or the amplitude) of the centred audio signal may be determined and may depend on the motion speed.

In a third step, the centred audio signal output from the high-pass filtering unit 30 is input into a spectral modelization unit 31, such as, for example, an auto-regressive model unit. The centred audio signal is further input into an energy determination unit 32, such as, for example, a mean-power computation unit. The spectral modelization unit 31 and the mean-power computation unit 32 may be dissociated units or may be combined in a single unit. The spectral modelization unit 31 is used to model the spectral properties of the audio signal $S_i$ 300 over time. The mean-power computation unit 32 is used to model the energy (or intensity) properties of the audio signal Si 300. The output of the spectral modelization unit 31 is a set of coefficients $F_i$ 301 associated with the model of the spectral modelization unit 31. The set of coefficients $F_i$ 301, when used by the model of the unit 31 (for example an auto-regressive model), enables to obtain a signal having frequency properties similar to the frequency properties of the signal $S_i$ 300 from a white noise input to the model. Such a model is represented for example by an all-pole infinite-impulse response filter (IIR) which coefficients are optimized so that a white noise filtered by this filter would have similar spectral properties as the ones of the signal $S_i$ 300. Any number of coefficients $F_i$ 301 may be output from the spectral modelization unit 31 (e.g., 64, 128, 256 or more coefficients). The use of an auto-regressive model to model an audio signal is for example described in "YASAS—YET ANOTHER SOUND ANALYSIS-SYNTHESIS METHOD" by Shlomo Dubnov. Determining the autoregressive coefficients may be performed by implementing the Yule-Walker equations, the Levinson-Durbin recursive algorithm or any other know process, such as described for example in "AUTOREGRESSIVE SPECTRAL ANALYSIS AS AN ALTERNATIVE TO FAST FOURIER TRANSFORM ANALYSIS OF DOPPLER ULTRASOUND SIGNALS" by F. S. Schlindwein and D. H. Evans, pages 74-84. The model implemented in the spectral modelization unit 31 is not limited to an auto-regressive model but extends to other types of model, for example a model using wavelet transform or a model using minimum variance distortionless response (MVDR), as described in "YASAS—YET ANOTHER SOUND ANALYSIS-SYNTHESIS METHOD".

The output of the energy determination unit 32 is a set of one or more parameters $A_i$ 302 representative of the energy (or the amplitude) of the signal $S_i$ 300. There is for example one energy parameter for each sample of the signal $S_i$ 300 or one energy parameter for the signal corresponding for example to the average of the amplitudes of the samples of the signal $S_i$ 300. If the speed of the second object on the second surface increases over the time while acquiring the signal Si 300, an energy parameter may be determined for each speed value or for a set of speed values representative of different speeds. If the speed of the second object on the second surface is constant over the time while acquiring the signal Si 300, an energy parameter may be determined for the signal, corresponding for example to the mean value of the amplitudes of the signal.

At the end of the process, N triplets $(v_i, F_i, A_i)$ are obtained for a determined second surface (of a determined material), N corresponding to the number of speeds 'v' for which reference sounds are modelled with the units 31 and 32, N being greater than or equal to 2, i being comprised between 1 and N. The same process may be performed for a plurality of second surfaces, i.e. for a plurality of different materials.

A library of reference sounds may be obtained with such a process, i.e. a plurality of reference sounds is associated with each second surface of a plurality of second surfaces, a determined speed being associated with each reference sound. The reference sounds are each described with a set of coefficients 'F' describing the spectral properties of the reference sound and with a set of one or more energy parameters 'A' describing the amplitude/energy of the reference sound.

The library comprising the description of the reference sounds may be obtained differently, i.e. without implementing the process of FIG. 3. The description of the reference sounds may be obtained from a library stored on a remote server via a communication network, for example via the Internet.

Figure 4:
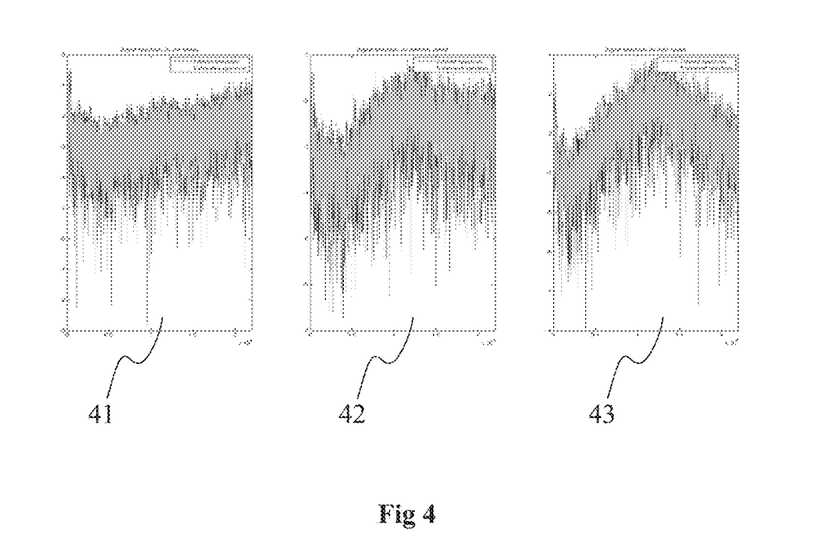
FIG. 4 shows signals representative of the reference sounds obtained with the process of FIG. 3, according to particular embodiments of the present principles.

FIG. 4 shows the frequency spectrum diagrams 41, 42 and 43 of signals, each representative of a reference sound, for a same second surface, according to a particular and non-limitative embodiment of the present principles.

The diagram 41 shows the frequency spectrum of a reference sound resulting from the high-pass filtering unit 30 (dark grey part) and the frequency spectrum (light grey part) modelled by using the model of the unit 31, for example an auto-regressive model, with the model coefficients associated with the second surface and the speed value (for example at low speed) used when acquiring the audio signal S input in the high-pass filtering unit 30. As it appears from the diagram 41, the frequency spectrum of the filtered signal S is very close from the frequency spectrum obtained with the auto-regressive model, meaning that the modelled signal is close from the "real" signal.

The diagram 42 also shows a comparison between the filtered "real" frequency spectrum and the modelled frequency spectrum of a signal representative of a reference sound for the same second surface as the diagram 41 but for a speed different from the speed of the diagram 41, for example for a medium speed.

The diagram 43 also shows a comparison between the filtered "real" frequency spectrum and the modelled frequency spectrum of a signal representative of a reference sound for the same second surface as the diagrams 41 and 42 but for a speed different from the speeds of the diagrams 41 and 42, for example for a high speed.

As can be seen from the diagrams 41, 42, 43, the modelled frequency spectrum is very close from the "real" frequency spectrum, whatever the speed value of the motion of the second object on the second surface.

Figure 5:
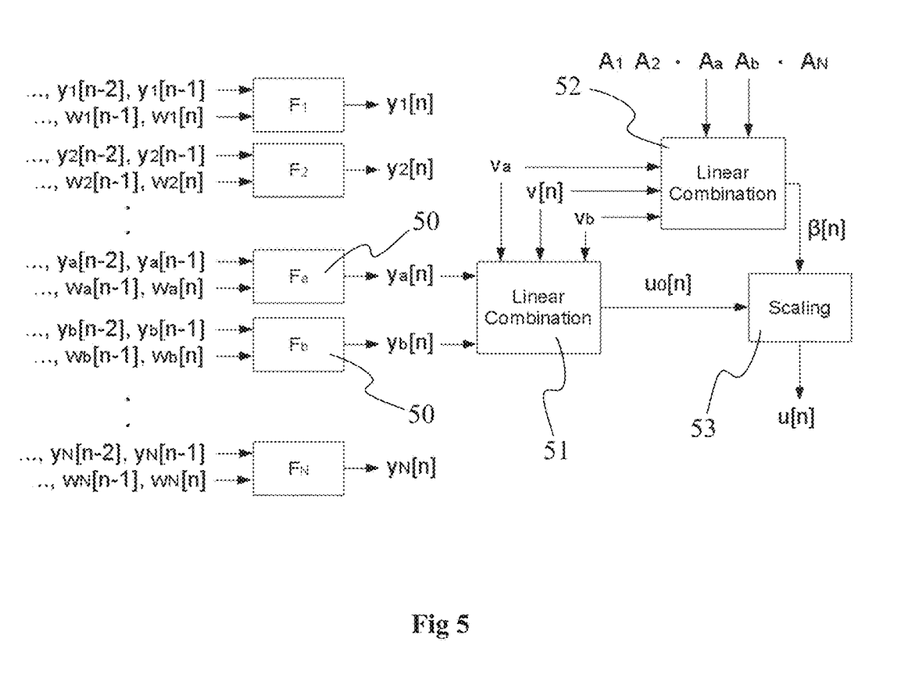
FIG. 5 diagrammatically shows a block diagram of a process to generate a sound when touching or rubbing the image of FIG. 1, according to a particular embodiment of the present principles.

FIG. 5 diagrammatically shows a block diagram of a process to generate a sound when touching or rubbing a first surface with a first object, according to a particular and non-limitative embodiment of the present principles. The process of FIG. 5 is described with reference to a determined speed v[n] and the process aims at obtaining a nth audio sample u[n] from the speed information v[n] and from triplets $(v_i, F_i, A_i)$ retrieved for example from a library.

In a first step, a plurality of triplets $(v_i, F_i, A_i)$ is retrieved from a library or database(s). According to a first example, two triplets with indices a and b $(v_a, F_a, A_a)$ and $(v_b, F_b, A_b)$ are retrieved from the library such that $v_a \leq v[n] \leq v_b$, $v_a$ and $v_b$ being the closest values of v in the library surrounding the value of v[n]. As $v_a, F_a, A_a$ are associated with each other in the library and $v_b, F_b, A_b$ are also associated with each other in the library, determining $v_a$ and $v_b$ enables to also retrieve the associated $F_a, A_a$ and $F_b, A_b$.

The number of triplets retrieved from the library is not limited to 2 but extends to any number greater than or equal to 2. For example, 3 triplets with indices a, b and c may be retrieved such that $v_a \leq v_b \leq v[n] \leq v_c$ or 4 triplets with indices a, b, c and d may be retrieved such that $v_a \leq v_b \leq v[n] \leq v_c \leq v_d$.

In a second step, spectral properties of two samples $y_a[n]$ and $y_b[n]$ modelled with a model 50, such as an autoregressive model, are computed using the model coefficients $F_a$ and $F_b$ determined in the first step. The modelled sample $y_a[n]$ is obtained by inputting samples $y_a[n-2]$, $y_a[n-1]$ modelled previously and white noise samples $w_a[n-1]$, $w_a[n]$ of a white noise into an auto-regressive model using the set of coefficients $F_a$. In a same way, the modelled sample $y_b[n]$ is obtained by inputting samples $y_b[n-2]$, $y_b[n-1]$ modelled previously and white noise samples $w_b[n-1]$, $w_b[n]$ of a white noise into an auto-regressive model using the set of coefficients $F_b$.

According to a variant, the spectral properties of N samples $y_1[n], y_2[n], y_a[n], y_b[n], y_N[n]$ are computed using the associated set of coefficients $F_1, F_2, F_a, F_b, F_N$, N corresponding to the number of triplets $(v_i, F_i, A_i)$ available in the library for a given second surface. The modelled samples associated with the speeds $v_a$ and $v_b$ are selected, $v_a$ and $v_b$ being such that $v_a \leq v[n] \leq v_b$.

In a third step, the spectral information $u_0[n]$ of the sample of the sound signal to generate when rubbing the first surface at an instant t with a speed v[n] are determined using the modelled samples $y_a[n], y_b[n]$ computed/selected previously. $u_0[n]$ is for example by interpolating $y_a[n]$ and $y_b[n]$, for example by linear combination 51 of $y_a[n]$ and $y_b[n]$, by taking into account the speeds associated with the values of $y_a[n]$ and $y_b[n]$, for example by applying the following equation:

$$u_0[n] = \frac{(v_b - v[n]) \cdot y_a[n] + (v[n] - v_a) \cdot y_b[n]}{v_b - v_a} \quad \text{Equation 1}$$

In a fourth step, that may be performed in parallel to the third step, a scaling factor $\beta[n]$ is computed, the scaling factor corresponding to the energy information of the sample of the sound signal to generate when rubbing the first surface at the instant t with the speed v[n]. $\beta[n]$ is obtained by interpolating the energy information retrieved from the library in the first step, for example by linear combination 53 of $A_a$ and $A_b$, by taking into account the speeds associated with the values of $A_a$ and $A_b$, for example by applying the following equation:

$$\beta[n] = \frac{(v_b - v[n]) \cdot A_a + (v[n] - v_a) \cdot A_b}{v_b - v_a} \quad \text{Equation 2}$$

The final sample u[n] of the sound to generate at time t to simulate the sound that would be generating when touching/rubbing the second surface while touching/rubbing a first surface different from the second surface is obtained by scaling 53 the frequency information $u_0[n]$ with the energy information $\beta[n]$. The final sample representative of the sound to synthesize at time t is for example obtained with the following equation:

$$u[n] = u_0[n] \cdot \beta[n] \quad \text{Equation 3}$$

The final sample may be obtained in one computation pass, for example by applying the following equation, meaning that the units 51, 52 and 53 form one single synthesizing unit:

$$u[n] = \frac{[(v_b - v[n]) \cdot y_a[n] + (v[n] - v_a) \cdot y_b[n]] \cdot [(v_b - v[n]) \cdot A_a + (v[n] - v_a) \cdot A_b]}{v_b - v_a} \quad \text{Equation 4}$$

According to a variant, the sample u[n] is obtained from only one reference sound, i.e. the reference sound having as associated speed, e.g. $v_a$ or $v_b$, the speed value the closest from v[n], which is for example $v_a$. According to this variant and in the case wherein $v_a$ is the speed, which is the closest speed value from v[n], u[n] corresponds to the absolute value of the result of equation 4 with $v_b=0$ and y[n]=0.

The exemplary embodiments according to FIG. 5 may be carried out by computer software implemented by one or more processors or by hardware, or by a combination of hardware and software. The units 50 to 53 may be software and/or hardware units. As a non-limiting example, the exemplary embodiments according to FIG. 5 may be implemented by one or more integrated circuits. One or more memories of any type appropriate to the technical environment may be implemented using any appropriate data storage technology, such as optical memory devices, magnetic memory devices, semiconductor-based memory devices, fixed memory and removable memory, as non-limiting examples. The one or more processors may be of any type appropriate to the technical environment, and may encompass one or more of microprocessors, general purpose computers, special purpose computers and processors based on a multi-core architecture, as non-limiting examples. A non-limiting example of such a technical environment will be described with more details with regard to FIG. 7.

Figure 6:
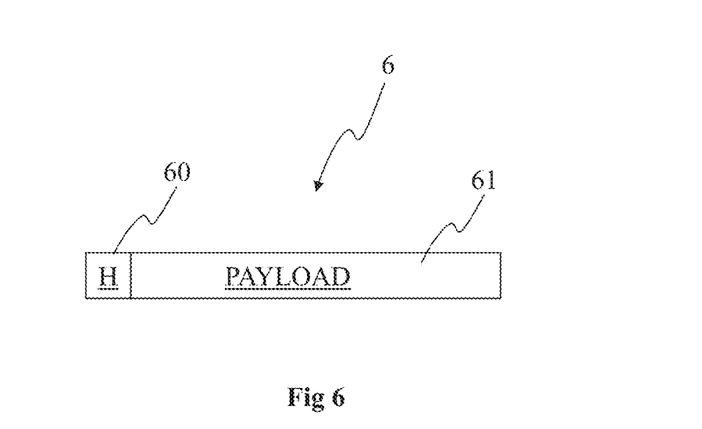
FIG. 6 shows a signal carrying the parameters representative of the sound generated with the process of FIG. 5, in accordance with an example of the present principles.

FIG. 6 shows an example of an embodiment of the syntax of a signal representative of a data stream corresponding to the sound to generate when rubbing/touching the first surface with the first objects, for example when the data are transmitted over a packet-based transmission protocol. Each transmitted packet 6 comprises a header H 60 and a payload 61. Frequency information and energy information of one or more samples u[n] are advantageously comprised in the payload 61.

Figure 7:
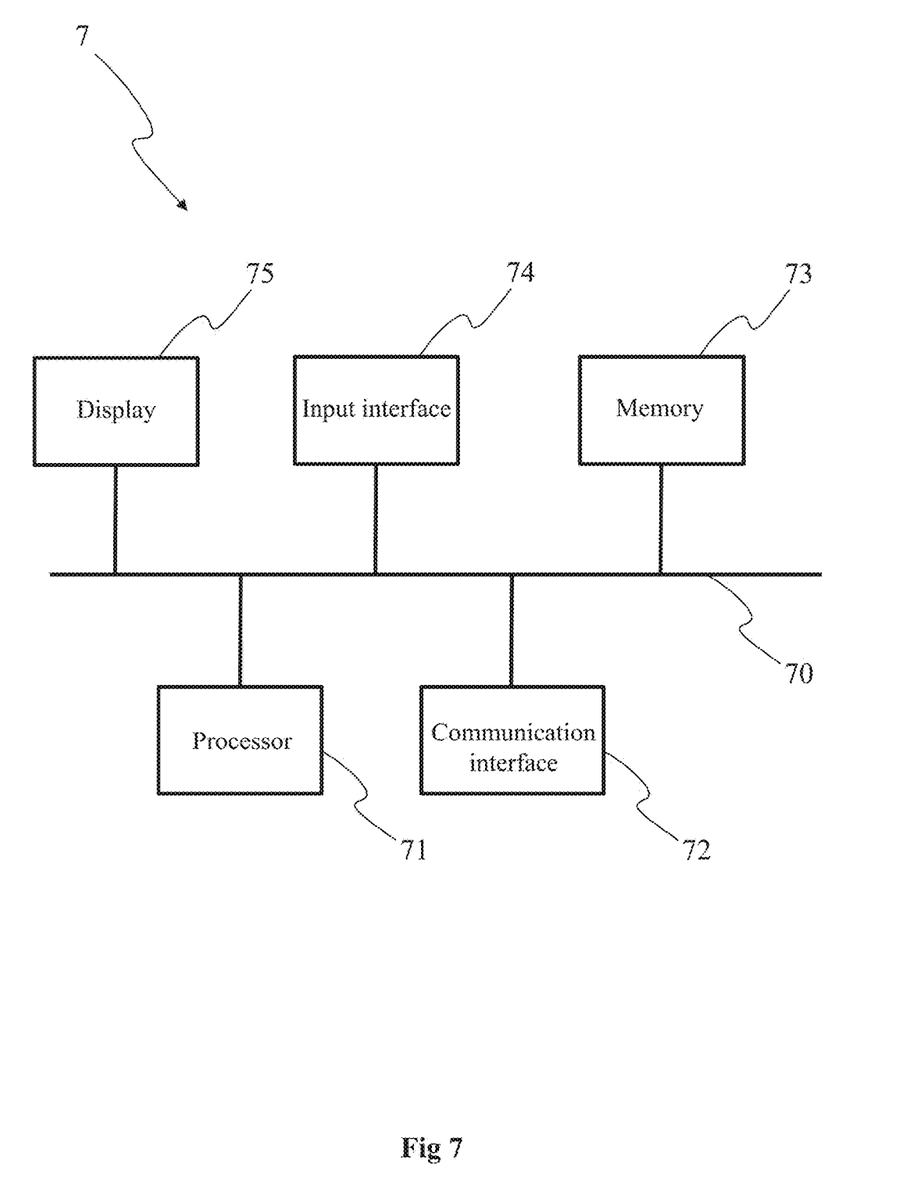
FIG. 7 shows a device configured to generate the sound obtained when touching or rubbing the image of FIG. 1, in accordance with an example of the present principles.

FIG. 7 shows an exemplary architecture of an apparatus 7 which may be configured to implement a method described in relation with FIGS. 3, 5 and/or 8.

The device 7 corresponds for example to a set-top box, a personal computer (PC), a laptop, a tablet, a Smartphone, a games console or a multimedia terminal.

The device 7 comprises the following elements, connected to each other by a bus 70 of addresses and data that also transports a clock signal:

One or more processors 71 (e.g. CPU ("Central Processing Unit"), DSP ("Digital Signal Processor") and/or GPUs ( ));

a memory 73, for example a volatile memory device or a non-volatile memory device for storing for example:
  the information representative of the reference sounds associated with reference speed information, i.e. the frequency information and the energy information, for example retrieved from a remote database,
  speed value(s) of the motion of the first object onto the first surface,
  frequency information and energy information of one or more samples of the sound to generate when rubbing/touching the first surface with the first object,
  a program executed by the processor(s) 71 and uploaded after switch on of the device 7, input data, intermediate data in different states of the method, and other variables, used for the execution of the method(s) according to the present principles.
one or several I/O (Input/Output) devices 74 such as for example a keyboard, a mouse, a touch surface;
a communication interface 72, e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface), configured to receive the information representative of the reference sounds (e.g. triplets ($v_i$, $F_i$, $A_i$)) and/or transmit the signal (e.g. under the form of a bitstream) comprising the sample(s) of the sound to generate, for example to one or more speakers; and
a display device 75 configured to display one or more images of the first surface.

According to a variant, the apparatus 7 may additionally include a storage device, which may include non-volatile memory, including, but not limited to, EEPROM, ROM, PROM, RAM, DRAM, SRAM, flash, magnetic disk drive, and/or optical disk drive. The storage device may comprise an internal storage device, an attached storage device and/or a network accessible storage device, as non-limiting examples.

The apparatus 7 is also configured for the generation and the coding of the signal (bitstream) representative of the sound to generate. In accordance with examples of encoding or encoder, the bitstream is sent to a destination. As an example, the bitstream is stored in a local or remote memory, e.g. a video memory or a RAM, a hard disk. In a variant, the bitstream is sent to a storage interface, e.g. an interface with a mass storage, a flash memory, ROM, an optical disc or a magnetic support and/or transmitted over a communication interface, e.g. an interface to a point to point link, a communication bus, a point to multipoint link or a broadcast network.

According to another variant, the display 75 is external to the apparatus and linked to the apparatus via a wired (e.g. USB, HDMI) or wireless connection (e.g. IEEE 802.11 interface, WiFi® or a Bluetooth®).

Figure 8:
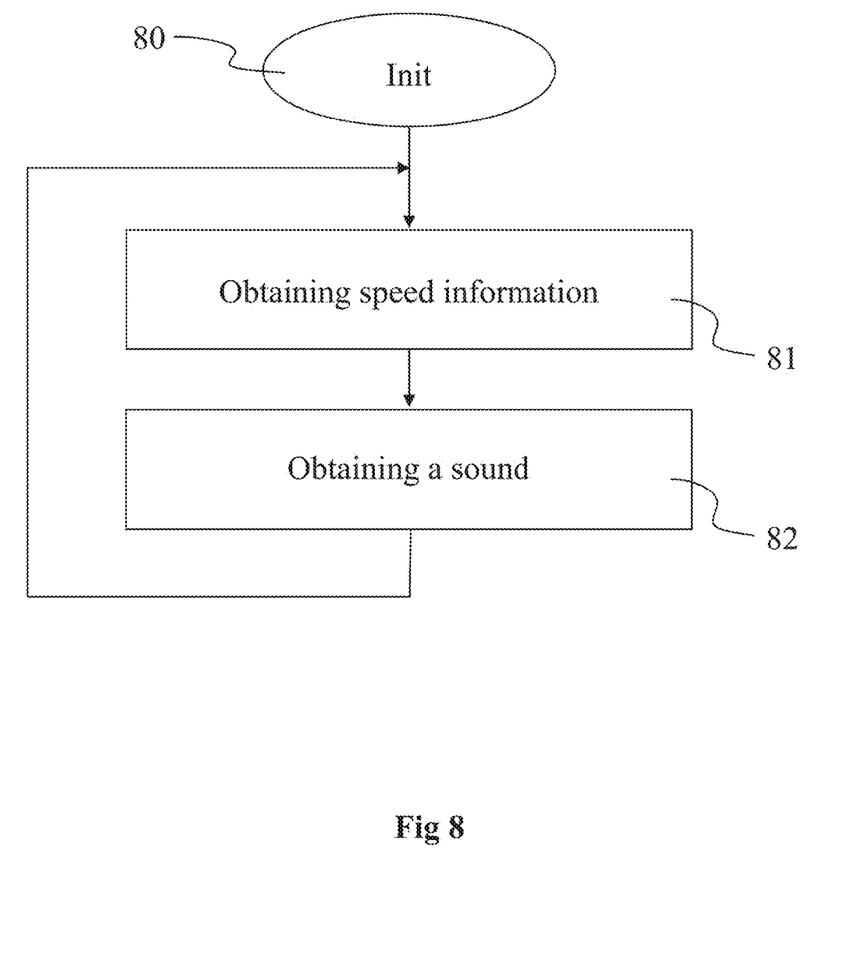
FIG. 8 shows a method for obtaining the sound when touching or rubbing the image of FIG. 1, in accordance with an example of the present principles.

FIG. 8 illustrates a method for obtaining a sound implemented in an apparatus 7, according to a non-restrictive embodiment of the present principles.

During an initialisation step 80, the different parameters of the apparatus 7 are updated. In particular, the information representative of the sound to synthesize, i.e. frequency and energy properties, are initialised in any way.

Then during a step 81, the speed of a first object moving on a first surface is obtained by any way. For example, if the first surface is a touch surface, the displacement of the first object over the first surface is measured and the speed is computed by the controller and/or the processor controlling the touch surface. If the first object is a mouse moving over a mouse pad or over a table, the speed of displacement is measured by the controller and/or the processor controlling the mouse. If the first object is a finger or a stylus moving over a display screen or over a table, the speed of displacement may be determined for example by processing and analysing a video of the first object or a stylus moving over the first surface, this process being known as real-time video tracking. According to another example, the speed of displacement may be obtained by the way of a tracking system comprising for example a marker (for example an optical marker) disposed on the first object and detectors (for example infrared lighting with infrared detectors) arranged in the environment of the first surface measuring and detecting the displacement of the marker to obtain the speed of the marker. The obtained speed information corresponds for example to a value expressed in $m \cdot s^{-1}$ and associated with a time. Several values may be obtained at time intervals, for example, a speed value may be determined at time interval(s) of 1 ms, 10 ms, 100 ms, 1 second or 10 seconds.

During a step 82, a sound is obtained based on two or more reference sounds and the speed information obtained during the step 81. The obtained sound corresponds to the sound that would be generated when rubbing or touching a determined material, an image of which being optionally rendered/displayed while moving the first object over the first surface. Obtaining (e.g. generating) a sound that corresponds to the rubbing of a real material increases the feeling that the first object moves of the surface of the determined real material, called second surface, while the first surface is different from the second surface. The reference sounds used to obtain (i.e. generate or synthesize) the obtained sound corresponds to the sounds generated when touching or rubbing the second surface at different speed values. Each reference sound is for example described with a set of parameters, for example a determined speed value and the corresponding frequency and energy properties of the sound for this determined speed value. The frequency properties are for example described with a set of coefficients that, when applied to a filter such as an auto-regressive model, enable to obtain frequency information of the reference sound from a white noise. With such a filter, the duration of the reference sound is only limited to the duration of the white noise. The energy properties of the reference sound are for example described with one amplitude value of the reference sound or with a set of amplitude values depending from the time when the amplitude of the reference sound varies over the time. The set of parameters describing each reference sound is for example obtained with a pre-process like the one described with regard to FIG. 3. According to a variant, the set of parameters describing each reference sound is obtained from a library stored locally or remotely on a storage device. Reference sounds may be associated with a second surface (i.e. the material) that is to be simulated. Each reference sound may be associated with a determined material being acquired for a different seed of displacement of a second object over the surface of the second surface.

The obtained sound is based on reference sounds having associated speed values, called second speeds, close to the speed of displacement of the first object over the first surface, called first speed. For example, the reference sounds used to obtain the sound are the reference sounds with associated second speed values surrounding the first speed, i.e. the second speed having the closest value less than the first speed value and the second speed having the closest value greater than the first speed value. According to a variant, more than two reference sounds are used to obtain the sound, for example two or more reference sounds having an associated second speed less than the first speed value and one, two or more reference sounds having associated second speed values greater than the first speed value. According to another example, one, two or more reference sounds having an associated second speed less than the first speed value are used and one, two or more reference sounds having associated second speed values greater than the first speed value.

The sound associated with the displacement of the first object over the first surface is for example obtained by interpolating the reference sounds, i.e. by interpolating the frequency information (interpolation in frequency) associated with the reference sounds to obtain the frequency information of the sound and by interpolating the energy information (interpolation in energy) associated with the reference sounds to obtain the energy information of the sound.

According to a variant, only one reference sound is used to obtain the sound. For example, the reference sound having the associated second speed value the closest to the first speed value is used to generate the sound, the sound to generate being this selected reference sound. According to this variant, the frequency information of the sound to obtain is the same as the frequency information of the reference sound and the energy information of the sound to obtain is the same as the energy information of the reference sound.

The sound is for example obtained sample by sample over the time. For a given sample, a first speed value is obtained and corresponding sample(s) of reference sound(s) is (are) selected according to its (their) associated second speed value.

In an optional step, the frequency and energy information associated with the obtained sound is transmitted, for example to one or more speakers.

According to another optional step, the obtained sound is rendered by the one or more speakers.

The present disclosure is not limited to the embodiments previously described.

In particular, the present disclosure is not limited to a method for obtaining a sound but also extends to any apparatus implementing this method.

The present disclosure also relates to a method of generating a signal comprising the frequency and energy information of the sound and to the apparatus configured to generate the signal.

The present disclosure also relates to a method of rendering the obtained sound and to the apparatus configured to render the obtained sound.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of generating a sound, the method comprising:
   obtaining an information representative of a first speed of a first object moving on a first surface;
   generating said sound according to information representative of at least two reference sounds and according to said information representative of the first speed, said at least two reference sounds corresponding to a sound obtained by moving a second object on a second surface with at least two second speeds, the first surface being different from the second surface, one different second speed being associated with each reference sound of said at least two reference sounds.

2. The method according to claim 1, wherein said first speed has a first value comprised between second values associated with the at least two second speeds.

3. The method according to claim 1, wherein generating said sound uses frequency information and energy information of said at least two reference sounds.

4. The method according to claim 1, wherein generating said sound comprises interpolating in frequency and in energy said at least two reference sounds.

5. The method according to claim 1, wherein frequency information associated with said sound is generated from frequency information associated with at least one modelled sample of each of the at least two reference sounds generated by an auto-regressive model.

6. The method according to claim 5, wherein the at least two reference sounds are modelled with said auto-regressive model.

7. The method according to claim 5, wherein frequency information associated with a sample of said sound is generated by linear combination of the modelled samples according to a value of said information representative of the second speed corresponding to said sample, and energy information associated with said sample of said sound is generated by linear combination of energy values associated with the at least two reference sounds.

8. An apparatus for generating a sound, the apparatus comprising at least one processor configured to:
   obtain an information representative of a first speed of a first object moving on a first surface;
   generate said sound according to information representative of at least two reference sounds and according to said information representative of the first speed, said at least two reference sounds corresponding to a sound obtained by moving a second object on a second surface with at least two second speeds, the first surface being different from the second surface, one different second speed being associated with each reference sound of said at least two reference sounds.

9. The apparatus according to claim 8, wherein said first speed has a first value comprised between second values associated with the at least two second speeds.

10. The apparatus according to claim 8, wherein the at least one processor is configured to use frequency information and energy information of the at least two reference sounds to generate said sound.

11. The apparatus according to claim 8, wherein the at least one processor is further configured to interpolate in frequency and in energy said at least two reference sounds.

12. The apparatus according to claim 8, wherein the at least one processor is configured to use at least one modelled sample of each of the at least two reference sounds generated by an auto-regressive model to obtain frequency information associated with said sound.

13. The apparatus according to claim 12, wherein the at least two reference sounds are modelled with said auto-regressive model.

14. The apparatus according to claim 12, wherein the at least one processor is configured to generate frequency information associated with a sample of said sound by linear combination of the at least one modelled sample according to a value of said information representative of the second speed corresponding to said sample, and to generate energy information associated with said sample of said sound by linear combination of energy values associated with the at least two reference sounds.

15. An apparatus for generating a sound, the apparatus comprising:
   means for obtaining an information representative of a first speed of a first object moving on a first surface;
   means for generating said sound according to information representative of at least two reference sounds and according to said information representative of the first speed, said at least two reference sounds corresponding to a sound obtained by moving a second object on a second surface with at least two second speeds, the first surface being different from the second surface, one different second speed being associated with each reference sound of said at least two reference sounds.

16. The apparatus according to claim 15, wherein said first speed has a first value comprised between second values associated with the at least two second speeds.

17. The apparatus according to claim 15, further comprising means for using frequency information and energy information of the at least two reference sounds to generate said sound.

18. The apparatus according to claim 15, further comprising means for interpolating in frequency and in energy said at least two reference sounds.

19. The apparatus according to claim 15, further comprising means for using at least one modelled sample of each of the at least two reference sounds generated by an auto-regressive model to obtain frequency information associated with said sound.

20. The apparatus according to claim 19, wherein the at least two reference sounds are modelled with said auto-regressive model.

21. The apparatus according to claim 19, further comprising means for generating frequency information associated with a sample of said sound by linear combination of the at least one modelled sample according to a value of said information representative of the second speed corresponding to said sample, and means for generating energy information associated with said sample of said sound by linear combination of energy values associated with the at least two reference sounds.

22. A non-transitory processor readable medium having stored therein instructions for causing a processor to perform at least the steps of the method according to claim 1.

* * * * *